United States Patent [19]

Bajtala et al.

[11] Patent Number: 4,556,154
[45] Date of Patent: Dec. 3, 1985

[54] CIGARETTE DISPENSER WITH ELECTRIC STARTER

[75] Inventors: Ladislav Bajtala, Haid; Pavel Puskin, Traun, both of Austria

[73] Assignee: System-Finanz Anlagenberatungsgesellschaft m.b.H., Salzburg, Austria; by said Ladislav Bajtala

[21] Appl. No.: 551,386

[22] Filed: Nov. 14, 1983

[30] Foreign Application Priority Data

Nov. 15, 1982 [EP] European Pat. Off. ........ 82110536.8

[51] Int. Cl.[4] .................. A24F 15/04; A24F 15/10
[52] U.S. Cl. .................... 221/147; 221/192; 312/86
[58] Field of Search ............... 221/143–147, 221/192, 254, 255; 206/85, 86, 250, 252; 312/73, 86

[56] References Cited

U.S. PATENT DOCUMENTS

| 1,197,796 | 9/1916 | Coggin . | |
|---|---|---|---|
| 1,974,462 | 9/1934 | Jay | 221/143 |
| 1,997,796 | 4/1935 | Jay . | |
| 2,083,465 | 6/1937 | Mayer | 312/86 X |
| 3,119,520 | 1/1964 | Christopher | 221/254 X |
| 3,548,148 | 12/1970 | Kawasima | 221/147 X |
| 3,705,414 | 12/1972 | Senkewich | 219/262 |
| 3,769,492 | 10/1973 | Senkewich | 219/262 |

FOREIGN PATENT DOCUMENTS

| 2104358 | 8/1972 | Fed. Rep. of Germany . |
| 2812457 | 9/1979 | Fed. Rep. of Germany . |
| 2842193 | 4/1980 | Fed. Rep. of Germany . |
| 3031436 | 2/1982 | Fed. Rep. of Germany . |
| 1299642 | 6/1962 | France . |

*Primary Examiner*—F. J. Bartuska
*Attorney, Agent, or Firm*—Flynn, Thiel, Boutell & Tanis

[57] ABSTRACT

A cigarette dispenser having an electric lighter, a housing including a storage chamber for the cigarettes and a dispenser opening on the front side of the housing. The dispenser opening is constructed by a horizontal slot of width and length larger than the diameter and the length of one cigarette. In front of the dispenser opening is provided a dispenser drawer which is movable up and down and is spring-loaded upwardly. The drawer has a closing edge which closes off the dispenser opening in the upper end position of the dispenser drawer. A cigarette-receiving surface is provided on the upper side of the dispenser drawer and a handle bar is provided on the front of the dispenser drawer. Above the dispenser opening is provided a stop fixed on the housing. Between the receiving surface and the stop is a recess of cross section which corresponds to a cigarette. The hot bulb of the lighter is located below the recess.

9 Claims, 6 Drawing Figures

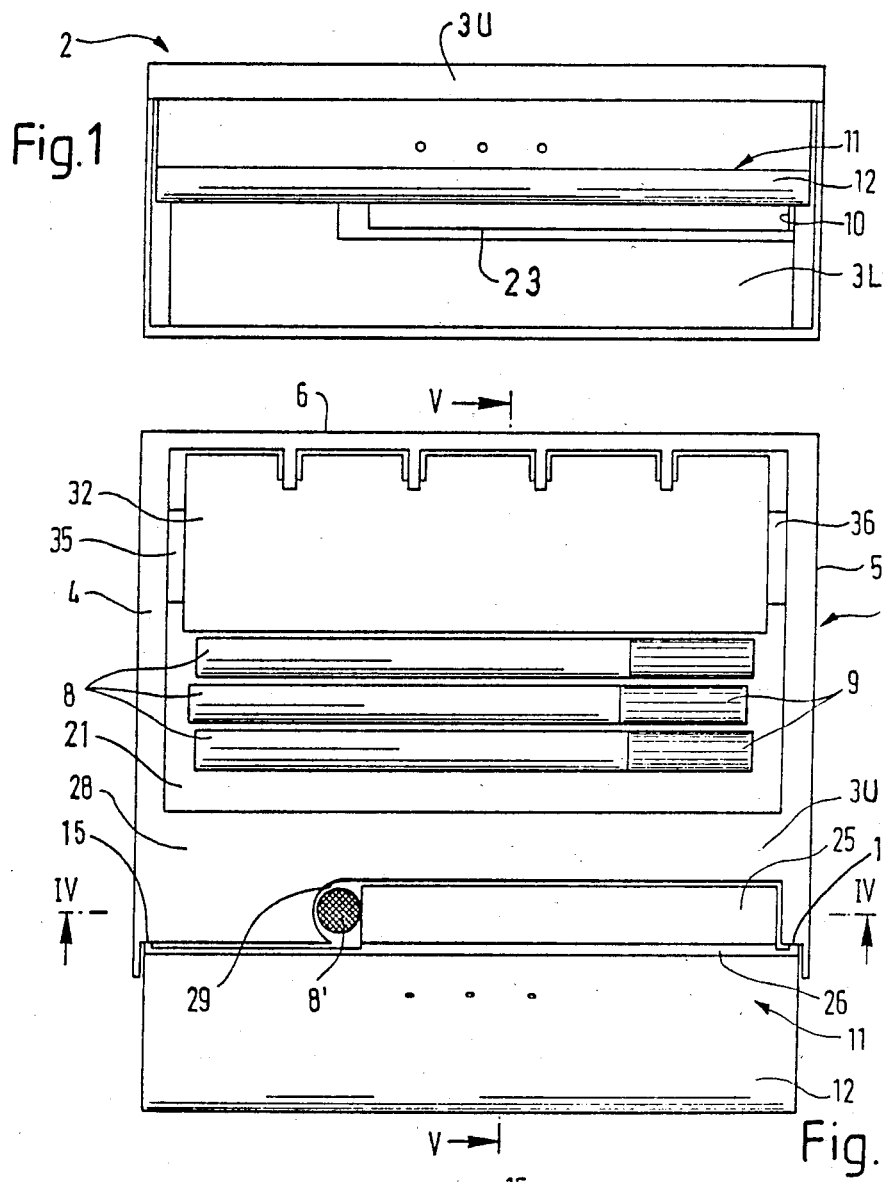
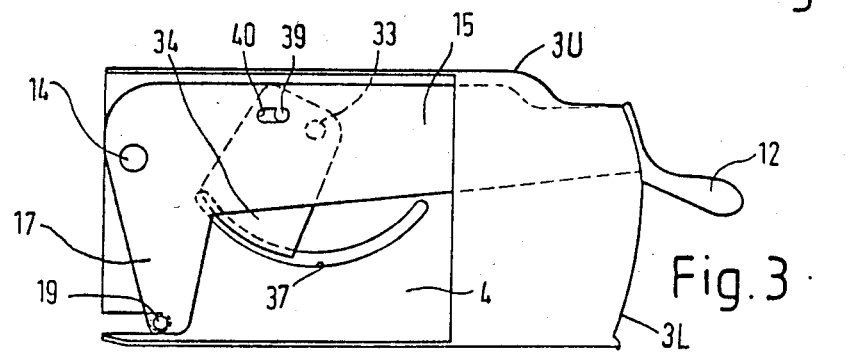

CIGARETTE DISPENSER WITH ELECTRIC STARTER

FIELD OF THE INVENTION

The invention relates to a cigarette dispenser with an electric starter (i.e. electric cigarette lighter) and more particularly wherein the dispenser has a housing with a storage chamber for cigarettes and a dispenser opening on the front side of the housing.

BACKGROUND OF THE INVENTION

Drivers, who are passionate smokers, do not want to give up their cigarette during driving. Typically, such a driver will hold the steering wheel with the one hand and search with the other hand for the cigarette pack. During this searching the attention of the driver is only partly directed to the road and the current traffic situation, while the remainder of his attention is directed to the search for the cigarette and its removal from the package. During a suddenly occurring critical traffic situation the driver thus only has available one hand and half of his attention. Therefore it is no surprise that, according to traffic statistics, very many accidents are due to the fact that the driver of a vehicle during the moment of the accident was distracted due to searching for a cigarette.

After the driver has found a cigarette, then his attention is directed to finding the electric cigarette lighter and then to guiding the lighter to the cigarette which is in the mouth. The driver's attention is totally committed if, as occasionally happens during lighting, embers fall from the cigarette onto the clothing of the driver, or onto the vehicle seat or floor and the driver is then busy trying to put out the embers. If the driver could receive a lit cigarette, then this would additionally contribute to a great degree to the safety of the driver.

German Offenlegungsschrift No. 28 42 193 discloses a cigarette dispenser with an electric lighter, which has a drum magazine with a chute-shaped storage, on the underside of which is provided a drum which is rotatable about a horizontal axis and has longitudinal grooves for receiving one cigarette each. A trough is provided under the drum. By rotation of the drum with a handle which is mounted from outside on the housing, a cigarette falls into the trough and thereby comes to lie next to the hot bulb of the lighter. The dispenser opening is provided at the end of the trough which lies opposite the hot bulb, from which dispenser opening the cigarette is pulled horizontally.

That conventional cigarette dispenser has the disadvantage that the cigarettes must be placed individually into the drum magazine, which is very timeconsuming. Also the trough or the dispenser opening lies below the housing, so that the capability for allowing gripping the cigarette for removal from the dispenser opening leaves much to be desired. Furthermore sufficient contact is not assured between the cigarette which lies in the trough and the hot bulb at the end of the trough. Furthermore the conventional cigarette dispenser is difficult to install in the dashboard of a motor vehicle due to its relatively great height.

A further cigarette dispenser which is known from German Offenlegungsschrift No. 30 31 436 is distinguished by an expensive mechanism for lighting and putting out cigarettes. The same is true for a cigarette dispenser which is known from German Offenlegungsschrift No. 28 12 457, which in addition also needs an electric motor.

A basic purpose of the present invention is to provide a cigarette dispenser with electric starter, in particular for motor vehicles, which permits with a simple mechanism a safe lighting and a good capability for gripping of the lit cigarette.

BRIEF DESCRIPTION OF THE DRAWINGS

One embodiment of the inventive cigarette dispenser is discussed in greater detail hereinafter in connection with the enclosed drawings, in which:

FIG. 1 is a front view of the cigarette dispenser;

FIG. 2 is a top view of the part of the cigarette dispenser which is pulled out of the receiving housing;

FIG. 3 is a side view of the part shown in FIG. 2;

DETAILED DESCRIPTION

Figure 4:
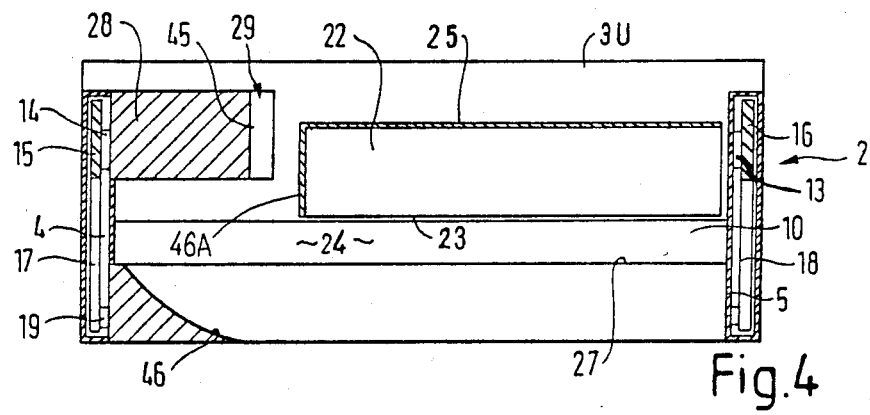
FIG. 4 is a cross-sectional view along the line IV—IV of FIG. 2, but omitting the lever arms of the pivotable slide valve, to show structure therebehind.

FIGS. 1 to 5 illustrate the sliding-compartment part (i.e. the drawer) of the cigarette dispenser, which is moved into the upper section A of the receiving housing 1.

The sliding-compartment part comprises a housing 2 with a front wall 3 (comprising a lower portion 3L forwardly and downwardly offset from an upper portion 3U), side walls 4 and 5, a back wall 6 and a bottom 7.

The housing 2 of the sliding-compartment part forms the storage chamber for receiving cigarettes 8, which are stored from above loosely, in parallel position and, if they are filter cigarettes, with all filters 9 on one side (FIG. 2).

A horizontal slot 10 is provided in the front wall 3 of the housing 2, the length of which slot is slightly greater than the length of the cigarettes 8 and the width of which is slightly greater than the width of the cigarettes 8, although smaller than twice the diameter of one cigarette 8.

Figure 5:
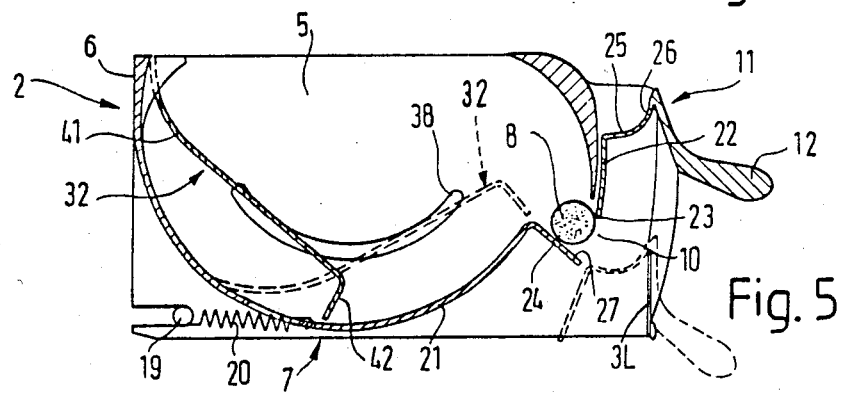
FIG. 5 is a cross-sectional view along the line V—V of FIG. 2.

In front of the slot, or dispenser opening, 10 there is provided a dispenser drawer 11 with a handle bar 12, which drawer can be moved up and down (as seen in FIG. 5).

The dispenser drawer 11 is arranged pivotally about a horizontal axis which is formed at the rearward area of the housing 2 by bearing points 13, 14 on the side walls 4, 5 of the housing 2. For this the dispenser drawer 11 is connected to its pivot axis to bearing points 13, 14 by two lever arms 15, 16 (FIGS. 3 and 4).

The dispenser drawer 11 is spring-loaded in the upward direction. For this, the two lever arms 15, 16 each have a respective further lever arm 17, 18 so that two toggle levers are formed. The free ends of the two further lever arms 17, 18 are connected to a rod 19 which extends beneath the back wall 6 of the housing 2.

Each end of the rod 19 is engaged by a tension spring 20 which with its other end is secured on a part 21 of the bottom 7 fixed to the housing 2 (FIG. 5).

The dispenser drawer 11 is provided with a closing surface 22 with a closing edge 23, which follows directly the slot, or dispenser opening, 10. In its upper end position illustrated in full lines in FIG. 5, which position corresponds with the rest position of the dispenser drawer 11 or in other words the initial position during operation of the dispenser drawer 11, the closing surface 22 with its closing edge 23 closes off the upper part of the slot, or dispenser opening, 10, so that a cigarette 8 located on a chute 24 at the front end of the housing-fixed part 21 of the bottom 7 cannot move through the slot 10.

The dispenser drawer 11 has furthermore on its upper side a cigarette-receiving surface, or trough, 25. A catching edge 26 is provided on the side of the trough 25 remote from the housing 2 and adjacent the handle bar 12. The catching edge 26 is arranged at a distance from the slot, or dispenser opening, 10, which slot is slightly larger than the diameter of one cigarette 8 and at any rate is smaller than 1½ times the diameter of one cigarette 8.

As can be seen from the lower end position of the dispenser drawer 11 shown in dotted lines in FIG. 5, the downwardly pressed dispenser drawer 11 unblocks the slot, or dispenser opening, 10 and locates the cigarette-receiving surface 25 directly below the lower edge 27 of the slot, or dispenser opening, 10 so that the cigarette 8 falls onto the receiving surface 25.

A stop 28 is secured on the upper front wall portion 3U of the housing 2 above the slot, or dispenser opening, 10 as shown in FIGS. 2 and 4. As can be seen in FIG. 2, the stop 28 has a side which faces the cigarette-receiving surface 25 of the dispenser drawer 11, which side has a recess 29. The recess 29 has a slightly larger cross section than a cigarette 8' which is shown oriented vertically in the recess 29.

Figure 6:
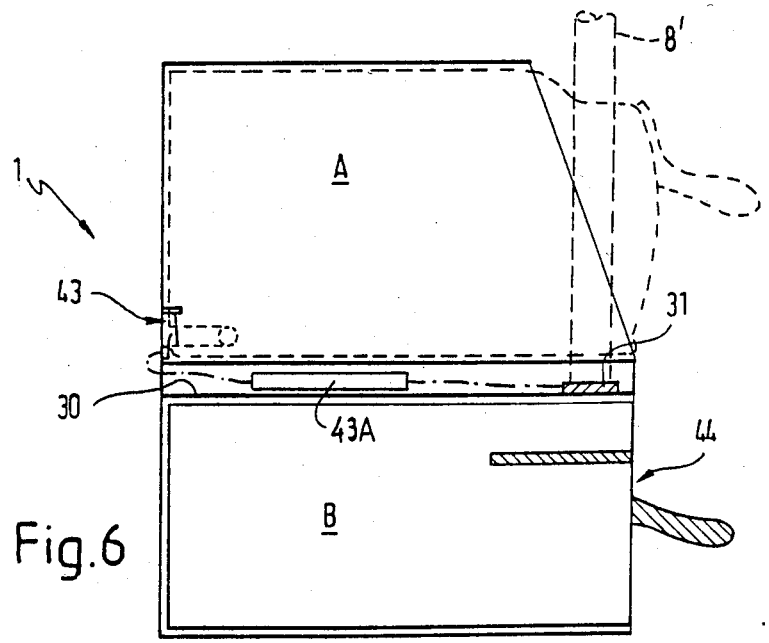
FIG. 6 is a cross-sectional view of the receiving housing with the pulled-out part of the cigarette dispenser.

The hot bulb 31 of an electric lighter (FIG. 6) is mounted on the upper side of an intermediate floor 30 of the receiving housing 1, namely exactly below the recess 29 with the vertically arranged cigarette 8' between the stop 28 and the receiving surface 25 (FIG. 2), when the sliding-compartment part housing 2 is inserted into the section A of the receiving housing 1.

The cigarette 8 which is moved, by mechanism described in greater detail hereinafter, onto the chute 24 and which falls from the chute 24 through the slot, or dispenser opening, 10, onto the receiving surface 24 when the dispenser drawer 11 is pressed down, will thus lie with its non-filter end under the stop 28 fixed on housing 2.

When the human operator lets go of the handle bar 12, the dispenser drawer 11 moves upward due to its springs 20 and in this manner lifts and tilts the cigarette 8', lying with its unfiltered end under the fixed stop 28, into the vertical position illustrated in FIG. 2, namely in the recess 29 with its filter 9 upwardly projecting.

Since the recess 29 is provided in front of the upper front wall portion 3 of the housing 2, it thus opens downwardly, so that the cigarette 8' then falls downwardly onto the hot bulb 31.

In order to achieve an exactly vertical positioning of the cigarette 8', guide surfaces 45 in FIG. 4 extend downwardly on the sides of the stop 28 and an edge 46A of the cigarette-receiving surface 25 faces into the recess 29. Below the stop 28, the housing 2 includes a camming surface 46. Elements 45, 46A and 46 aid in tilting a cigarette to an upright condition as at 8'.

For the mechanism for the transport of cigarettes 8 in the storage chamber below the chute 24 onto the latter, the floor 7 of the storage chamber, or housing 2 is formed by the housing-fixed part 21 and a slide member 32.

The slide member 32 is constructed as a pivotable slide valve. The pivot bearings points 33 of the pivotable slide valve 32 are provided on the outer side of the two side walls 4 and 5 in the upper area of the housing 2. The two bearing points 33 define a pivot axis for the slide valve 32 in the storage chamber. The bearing points 33 each pivotally support respective lever arms 34 which extend downwardly between the corresponding side wall 4, 5 and lever arm 15, 16 of the dispenser drawer 11. From the lower end of the lever arms 34 extend respective connecting arms 35, 36 which project through respective circular arc-shaped slots 37, 38 in the housing side walls 4, 5. The connecting arms 35, 36 are fixed to opposite ends of the slide valve 32.

The pivoting of the lever arms 34 and thus of the slide member 32 mounted thereon is done by eccentric cams 39 provided on the lever arms 34, which cams 39 each engage a longitudinal slot 40 in respective ones of the two lever arms 15, 16 of the dispenser drawer 11.

If the dispenser drawer 11 is not in operation, the eccentric cam 39 is pressed upwardly thereby and thus the slide member 32 is held in the rearward rest position illustrated in FIG. 3 and in full lines in FIG. 5.

The housing-fixed part 21 (FIG. 5) of the floor 7, which part 21 is located in front of the rest position of the slide member 32, is constructed concavely of circular arc-shape, and concentrically of the pivot axis of the slide member 32.

The rotary slide valve 32 has on its radially outer end, which faces the circular arc-shaped floor section, a substantially radially extending slide member portion 42. The width of the slide member portion 42 corresponds approximately with the thickness of one cigarette 8. From the slide member portion 42 which extends substantially radially extends a floor section 41 toward the rear wall 6 of the housing 2.

It can be seen that pressing down of the dispenser drawer 11 acts through the longitudinal recess 40 on the lever arm 15, 16 and the eccentric cams 39 on the lever arms 34 to swing the slide member 32 forward to the chute 24, so that at least one cigarette 8 moves forward along the floor portion 21 onto the chute 24.

Pressing down of the dispenser drawer 11 also moves rearwardly the rod 19 carried between the lever arms 17 and 18 and thereby operates a switch 43 (FIG. 6) in the rearward area of the receiving housing 1.

Operation of the switch 43 may be used in any convenient way to apply voltage to the hot bulb 31 to heat same for igniting the upstanding cigarette 8'. For example, operation of the switch 43 may actuate an electronic circuit 43A provided on the intermediate floor 30 of the receiving housing 1 for applying voltage to the hot bulb 31 and incorporating a time regulator (not shown) which limits the duration of the igniting operation to the necessary time. The end of the igniting operation may be indicated by an acoustic signal transmitter (not shown) in the electronic circuit.

Below the in-between floor 30 there is provided in the section 8 of the receiving housing 1 an ash tray 44 which can be pulled out.

The ideal arrangement of the inventive cigarette dispenser in a motor vehicle is in the dashboard. The front of the receiving housing 1 with the sliding compartment part or housing 2, which can be pulled out, and the ash tray 44 is then provided in the plane of the dashboard 22.

It is possible with the inventive dispenser to dispense and ignite, in general, cigarettes of any desired cross section and any desired length, and of course also cigarillos and cigars. In the case of mass production, the dimensions will be chosen such that, as much as possible, all cigarette brands available on the market are useable.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A cigarette dispenser having an electric lighter including a hot bulb, a housing with a storage chamber for the cigarettes, and a dispenser opening on the front side of the housing, comprising in combination:
   (a) a dispenser opening which is formed by a horizontal slot of a width and a length larger than the length and cross section of one cigarette;
   (b) an up and down movable, upwardly spring-loaded dispenser drawer located in front of the dispenser opening and having a closing edge, said closing edge in the upper end position of the dispenser drawer closing off the dispenser opening to a cross section smaller than the longitudinal cross section of one cigarette, the dispenser drawer having an upper side on which is a cigarette-receiving surface, said cigarette-receiving surface having a catching edge, said dispenser drawer in its lower end position being located below the dispenser opening, said dispenser drawer having a handle on the front side thereof;
   (c) a stop fixed on said housing directly above and on one side of the dispenser opening; and
   (d) a recess between the cigarette-receiving surface and the stop, said recess having a larger cross section than the cross section of one cigarette;
   (e) the hot bulb of the starter being located below the recess and forming a rest for a cigarette whose mouth-piece end projects upward out of the recess, the dispenser drawer being pivotable about a horizontal axis located in the rearward area of the housing on two lever arms which extend along the side walls of the housing, wherein at least one of the lever arms of the dispenser drawer is formed by a toggle lever having a further lever arm, a spring engaging the end of the further lever arm of the toggle lever for the spring loading of the dispenser drawer, the further lever arm being remote from the dispenser drawer, the spring having a free end secured on the housing.

2. A cigarette dispenser according to claim 1, wherein said housing is constructed as a sliding compartment part, into which is movable said sliding compartment part a receiving housing, the hot bulb of the lighter being secured on the receiving housing.

3. A cigarette dispenser according to claim 1, including a chute which extends from the lower edge of the dispenser opening upwardly into the storage chamber, the catching edge being spaced from the dispenser opening with a spacing less than 1½ times the thickness of one cigarette.

4. A cigarette dispenser according to claim 3, wherein the storage chamber is located at least partially below the upper end of the chute and is separated therefrom by the dispenser opening, a slide member responsive to operation of the dispenser drawer for moving cigarettes in the storage chamber from below the upper end of the chute into the chute.

5. A cigarette dispenser according to claim 4, wherein the slide member is constructed as a pivotable slide valve and the floor of the storage chamber has a circular arc-shaped portion which extends concentrically with respect to the pivot axis of the pivotable slide valve and extends from below upwardly to the upper end of the chute.

6. A cigarette dispenser according to claim 4, wherein the slide member has at least one eccentric cam, which engages in a longitudinal slot in one of the two lever arms of the dispenser drawer.

7. A cigarette dispenser according to claim 5, wherein the pivotable slide valve has bearing points located on the outside on the side walls of the housing and between the side walls of the housing and the lever arms of the dispenser drawer, the pivotable slide valve being supported by two connecting arms, the connecting arms extending from bearing points on the outside of the side walls of the housing along the side walls and then inward through circular arc-shaped slots in the side walls of the housing into the storage chamber, the recesses being concentric with the pivot axis of the pivotable slide valve.

8. A cigarette dispenser according to claim 5, wherein the pivotable slide valve at its radial outer end, which is adjacent to the circular arc-shaped floor portion, has a substantially radially extending slide member portion of width which corresponds approximately with the diameter of one cigarette and a floor portion which extends away from the radial slide member portion, the floor portion of the pivotable slide valve extending to the rear wall of the housing.

9. A cigarette dispenser according to claim 1, wherein the further lever arm of the toggle lever operates a switch for actuating the electric lighter.

* * * * *